2,811,432

HERBICIDAL COMPOSITION

Harold E. Bruner, Akron, Ohio, assignor to Monsanto Chemical Company, St. Louis, Mo., a corporation of Delaware No Drawing. Application July 17, 1953,
Serial No. 368,823

6 Claims. (Cl. 71—2.3)

This invention relates to improved herbicidal compositions and to the method of destroying undesired vegetation. More particularly the invention relates to a herbicidal composition comprising an alkali metal salt of pentachlorophenol as an essential toxic ingredient.

Sodium pentachlorophenate has long been recognized as having potent herbicidal activity but possesses the very serious shortcoming of being highly irritating and unpleasant to handle in the dry state. All of the commercial forms, whether powder, pellets or briquettes, contain noticeable quantities of finely divided dust. The dust is very irritating to the mucous membranes of the eyes, nose and throat and very low concentrations provoke sneezing and coughing. Furthermore, the dust is irritating to the skin of most persons and results in severe discomfort. These shortcomings have resulted in a general reluctance to employ this otherwise valuable herbicide. Use has been largely confined to skilled operators who are trained to take the elaborate precautions necessary to avoid serious discomfort.

It has been found, however, that a mixture of an alkali metal pentachlorophenate with an alkali metal xanthate herbicide obviates these difficulties to the extent that general use of the composition is feasible. Furthermore, the replacement of part of the pentachlorophenate with the xanthate has been found to retain the herbicidal properties characteristic of pentachlorophenate. Thus, the dosage used and the weed control obtained are essentially equivalent to that obtained with an equivalent weight of pentachlorophenate.

The proportion of sodium pentachlorophenate may vary although it should be at least 50% by weight of the composition. As much as 90% by weight sodium pentachlorophenate may be present and the irritating effects will be reduced by the presence of approximately 10% by weight of an alkali metal xanthate herbicide. The results are better with 25% xanthate however and the preferred compositions comprise approximately equal parts by weight of the two ingredients. Other ingredients may be present. The addition of other compatible herbicides such as trichloroacetic acid is feasible. The presence of surface active agents has been found to be unnecessary and are usually omitted but may be included if desired. Sodium dodecyl benzene sulfonate may be incorporated in small amount. Water soluble long chain alcohol sulfates, water soluble aralkyl sulfonates, water soluble sorbitan monolaurates, palmitates, stearates and non-ionic type surface active agents obtained by the reaction of tall oil or a long chain mercaptan with ethylene oxide are examples of materials which may be used. Usually from 0.01% to 1.0% by weight of surface active agent is employed. Although use in aqueous medium is contemplated for the most part, as both ingredients are easily water soluble, the composition may be applied as a dust. In this case inert powdered solid diluents are desirable. Examples are fuller's earth, kieselguhr, chalk, talc and clay.

Both sodium pentachlorophenate and sodium xanthate herbicides are contact herbicides which are not translocated in the plant. Thorough coverage of the foliage with the proper concentration will kill all above-ground herbaceous weed growth. Weeds and certain crops are controlled best by pre-emergence application. Furthermore, the compositions may be economically used for virtually all the weed control problems encountered in berry vine culture, orchards and vineyards.

Generally 15 to 25 pounds of the herbicide composition per acre of treated surface are required for effective pre-emergence control of weeds. In this dosage range the following crops have been found to be tolerant to the new compositions: Asparagus, lima beans, snap beans, field corn, sweet corn, horseradish, peanuts, peas, peppermint, popcorn, potatoes, pumpkin, soybeans and squash. The composition is made up in simple water solution and applied directly to the soil on which weed control is desired. The required amount of composition is dissolved just prior to spraying in enough water to insure thorough, uniform coverage. This usually requires 50 to 100 gallons of water per acre of treated area, depending on the type of equipment in use. Spray heads are adjusted for either band or complete coverage as desired. Seeded areas should be sprayed 24 to 48 hours before the crop emerges but weed seedlings may or may not have emerged.

As a specific embodiment of the invention, an admixture was prepared of substantially equal parts by weight of sodium pentachlorophenate powder (pellet fines) and sodium ethyl xanthate powder. Many persons subject to violent sneezing when standing within 10–15 feet of an open drum of sodium pentachlorophenate were able to stand and breathe immediately over a drum of the aforesaid admixture without sneezing or other ill effects There was no dust cloud when the mixture was poured out or scooped up. Persons unable to tolerate exposure to sodium pentachlorophenate dust weighed out the mixture and prepared herbicidal sprays from it without ever realizing sodium pentachlorophenate was present. While the sensitivity of individuals to sodium pentachlorophenate varies widely, the rate of burning from contact of the skin with the admixture is in general markedly reduced as compared to pure sodium pentachlorophenate. The hazard and inconvenience of handling the latter is illustrated by the recommendation of the manufacturer to open the bags under water.

The admixture was applied to seeded areas in Ohio at the rates shown in the following table, application being made before either the crop or weeds emerged.

*Table I*

| Crop | Herbicide Used, Pounds per Acre | Water Used, Gallons per Acre |
| --- | --- | --- |
| Asparagus | 20 | 80 |
| Snap beans | 20 | 100 |
| Lima beans | 24 | 50 |
| Corn | 10 | 100 |
| Sweet corn | 20 | 100 |
| Peas | 30 | 100 |
| Potatoes | 22 | 40 |
| Pumpkin | 10 | 100 |
| Soybeans | 15 | 33 |

In general the weed control is above 80% when the dosage is 20 pounds or more per acre. Weed control is in the range of 60% or more at a dosage of 10 pounds per acre. Similar results were obtained on areas seeded to tomatoes, spinach, red beets, alfalfa, dill, onions, radishes, sugar beets, carrots and cabbage. Similar results were also obtained by treating the ground ahead of setting out tomato, cabbage, strawberry, pepper, celery, and tobacco plants. The weeds encountered included lamb's quarters, galinsoga, purslane, annual grasses and miscellaneous other weeds.

Tests carried out on potatoes in which sodium pentachlorophenate and a mixture of equal parts by weight of sodium pentachlorophenate and sodium ethyl xanthate were compared showed a substantial increase in yield obtained by use of the mixture. The tests were pre-emergence applications applied 24 to 48 hours before the crop emerged. The weeds encountered in the area included foxtail, smartweed, ragweed, nut grass, purslane, and lamb's quarters. Weed counts were taken at random within the plots. A square loop of wire was tossed at random in the area and the weeds within the closure counted after about one month. The results were average for several replicated tests. The data are summarized below:

Table II

| Herbicide | Pounds Applied per Acre | Total Weed Count | Yield, Bushels per Acre |
| --- | --- | --- | --- |
| Sodium pentachlorophenate | 20 | 36 | 140 |
| Mixture of equal parts by weight of sodium pentachlorophenate and sodium ethyl xanthate | 20 | 66 | 180 |
| None—check | | 540 | 52 |

Weed control on dill plots to which pre-emergence application of a mixture of equal parts by weight of sodium pentachlorophenate and sodium ethyl xanthate was applied is shown in Table III. The herbicide was applied at the rate of 20 pounds per acre.

Table III

| | Treated | Untreated |
| --- | --- | --- |
| Total weed count after about one month | 24 | 59 |

The weeds encountered were redroot, lamb's quarters, purslane, and smartweed.

In other tests the injury to cabbage was determined by applying the herbicide to the seeded area 24 to 48 hours before the cabbage plants emerged and comparing the number of emerged plants:

Table IV

| Herbicide | Lbs./Acre | Stand Count |
| --- | --- | --- |
| Sodium pentachlorophenate | 20 | 61 |
| Mixture of equal parts by weight of sodium pentachlorophenate and sodium ethyl xanthate | 20 | 149 |
| None—check | | 79 |

Both weed counts and stand counts were taken on plots seeded to sugar beets in Ohio. Again, pre-emergence application of the herbicide was made 24 to 48 hours before the beets emerged and the weed counts were taken after about one month:

Table V

| Herbicide | Lbs./Acre | Weed Count | Stand Count |
| --- | --- | --- | --- |
| Sodium pentachlorophenate | 20 | 12 | 59 |
| Mixture of equal parts by weight of sodium pentachlorophenate and sodium ethyl xanthate | 20 | 21 | 121 |
| None—check | | 92 | 105 |

The weeds encountered in the above test were ragweed, foxtail, nut grass and pea vine.

Effective weed control was secured on muck land seeded to snap beans. Pre-emergence application of a mixture of equal parts by weight of sodium pentachlorophenate and sodium ethyl xanthate was applied at the rate of 10 pounds per acre 24 to 48 hours before the beans emerged. The weed count after one month was 43 for the treated area as compared to 330 for the untreated control.

Ohio muck land was seeded to onions May 6, herbicide spray applied May 11, and the plots checked for weeds June 8:

Table VI

| Herbicide | Lbs./Acre | Weed Count | Stand Count |
| --- | --- | --- | --- |
| Sodium pentachlorophenate | 20 | 184 | 16 |
| Mixture of equal parts by weight of sodium pentachlorophenate and sodium isopropyl xanthate | 20 | 158 | 244 |
| Sodium isopropyl xanthate | 10 | 225 | 284 |
| None—check | | 364 | 137 |

The weeds encountered included redroot, purslane, lamb's quarters, foxtail, and smartweed. It is evident that the mixture of xanthate and phenate effected excellent weed control without injury to the crop. The lower stand count for the untreated check is of course the result of weeds crowding out onions. It will be noted that sodium pentachlorophenate caused marked injury to the crop.

Although the active ingredient was applied as a water solution in the foregoing tests, good results were also obtained when oil was present. For example, a typical successful formulation for an oil emulsion is the following:

Mixture of equal parts by weight sodium pentachlorophenate and sodium ethyl xanthate _____ lbs__ 20
Aromatic type mineral oil _____ gals__ 5
Emulsifier _____ oz___ 5
Water _____ gals__ 100

Where an oil-in-water emulsion is intended the oil may, if desired, be added to the dry admixture of the xanthate and pentachlorophenate. The oil further reduces the dustiness and irritating effects. Furthermore, water of crystallization may be present with the xanthate and also tends to alleviate dustiness. While sodium isopropyl xanthate or sodium ethyl xanthate are preferred and may be used interchangeably or in admixture, with equivalent results others may be used, as for example sodium propyl xanthate, sodium butyl xanthate and sodium allyl xanthate. Although certain xanthates have been reported to be effective herbicides only when a surface active agent is present, this has not proved to be the case when used in admixture with sodium pentachlorophenate.

The sodium pentachlorophenate is preferably in the form of flakes or pellet fines. The material is also available in pellet form but this form is less desirable. Pelletizing has not eliminated dustiness but on the contrary considerable proportions of fine particles are always present with the pellets. Admixing the pellets with a xanthate reduces dustiness but the results are much better with finely divided forms of sodium pentachlorophenate. Furthermore, the differential rate of solution resulting from a wide range of particle sizes is inconvenient. For optimum results sodium pentachlorophenate of 40-50 mesh (U. S. standard) is required. As shown by the results described herein, admixing sodium pentachlorophenate with a xanthate herbicide markedly increases the safety to the crop as well as safety to the operators while maintaining effective weed control properties.

It is intended to cover all changes and modifications of the examples of the invention herein chosen for purposes of disclosure which do not constitute departures from the spirit and scope of the invention.

What is claimed is:

1. An essentially dry herbicidal composition comprising a mixture of sodium pentachlorophenate as the essential active ingredient and a sodium lower alkyl xanthate herbicide in proportion sufficient to reduce irritation to skin and mucous membranes of persons exposed to the dry composition.

2. An essentially dry herbicidal composition comprising approximately equal parts by weight of sodium pentachlorophenate and a sodium lower alkyl xanthate herbicide.

3. An essentially dry herbicidal composition comprising 50 to 75 parts by weight of sodium pentachlorophenate and 25 to 50 parts by weight of sodium ethyl xanthate.

4. An essentially dry herbicidal composition comprising 50 to 75 parts by weight of sodium pentachlorophenate and 25 to 50 parts by weight of sodium isopropyl xanthate.

5. An essentially dry herbicidal composition comprising approximately equal parts by weight of sodium pentachlorophenate and sodium ethyl xanthate.

6. An essentially dry herbicidal composition comprising approximately equal parts by weight of sodium pentachlorophenate and sodium isopropyl xanthate.

References Cited in the file of this patent

UNITED STATES PATENTS

| | | |
|---|---|---|
| 2,188,734 | Carswell | Jan. 30, 1940 |
| 2,370,349 | Hance | Feb. 27, 1945 |
| 2,435,676 | Fitzgerald et al. | Feb. 10, 1948 |
| 2,562,011 | Baumgartner | July 24, 1951 |
| 2,599,827 | Hansberry | June 10, 1952 |
| 2,600,045 | Blondeau et al. | June 10, 1952 |
| 2,600,861 | Englund | June 17, 1952 |

OTHER REFERENCES

Harvey et al.: in "Science," vol. 84, No. 2181, Oct. 16, 1936, page 356.